(12) United States Patent
Chang et al.

(10) Patent No.: US 11,144,100 B2
(45) Date of Patent: Oct. 12, 2021

(54) REMOVABLE BMC CARRIER MODULE

(71) Applicant: Quanta Computer Inc., Taoyuan (TW)

(72) Inventors: Chun Chang, Taoyuan (TW);
Shih-Hsuan Hu, Taoyuan (TW);
Cheng-Feng Tsai, Taoyuan (TW);
Wei-Cheng Tseng, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 41 days.

(21) Appl. No.: 16/858,152

(22) Filed: Apr. 24, 2020

(65) Prior Publication Data

US 2021/0232188 A1 Jul. 29, 2021

Related U.S. Application Data

(60) Provisional application No. 62/964,943, filed on Jan. 23, 2020.

(51) Int. Cl.
*G06F 1/18* (2006.01)

(52) U.S. Cl.
CPC ..................... *G06F 1/185* (2013.01)

(58) Field of Classification Search
CPC .......... G06F 1/185; G06F 1/186; G06F 1/184; H05K 7/1417
See application file for complete search history.

(56) References Cited

U.S. PATENT DOCUMENTS

| | | | |
|---|---|---|---|
| 8,837,135 B2* | 9/2014 | Zheng | H05K 7/1421 361/679.32 |
| 10,624,226 B1* | 4/2020 | Alvarado | H05K 5/0256 |

* cited by examiner

*Primary Examiner* — James Wu
(74) *Attorney, Agent, or Firm* — Nixon Peabody LLP

(57) ABSTRACT

A baseboard management controller (BMC) carrier module that contains a BMC carrier bracket and a thumb screw is disclosed. The BMC carrier bracket has a back plate, a top plate, a side plate, and a corner plate. The corner plate includes a first section and a second section. The second section of the corner plate extends perpendicularly from the first section of the corner plate. The BMC carrier bracket is configured to receive a BMC board between the first section of the corner plate and the side plate. The BMC board includes an aperture to receive a screw to secure the BMC board to the BMC carrier bracket, at a distance from the back plate. The thumb screw is coupled to the second section of the corner plate of the BMC carrier bracket, and is configured to bias a memory carrier module against the side plate.

20 Claims, 13 Drawing Sheets

REMOVABLE BMC CARRIER MODULE

CROSS-REFERENCE TO RELATED APPLICATIONS

This application claims priority under 35 U.S.C. § 119 to U.S. Provisional patent Application No. 62/964,943, titled "BMC Board +M.2 Carrier Mechanism Design," and filed on Jan. 23, 2020. The contents of that application are hereby incorporated by reference in their entirety.

TECHNICAL FIELD

This disclosure relates generally to BMC modules, and more particularly, to removable BMC carrier modules.

BACKGROUND

Typically, a conventional server includes a system sled that contains a motherboard, a central processing unit (CPU), a baseboard management controller (BMC) board, a memory card for the BMC board, and other electronic components. A BMC is an independent controller that monitors the physical state of the server, and communicates with a system administrator through an independent connection. BMCs thus are necessary for a management device to monitor a server in an environment such as a data center. A memory card is typically connected to the BMC, and is used to boot the BMC and provide additional storage (e.g., extending the capacity of the BMC).

In a typical server, the motherboard supports components such as processors, network interface cards, and memory devices such as HDDs or SSDs. The motherboard is positioned at the bottom of the system sled. The BMC board is positioned flat (e.g., horizontally) on top of the motherboard, and adjacent to the CPU. The memory card for the BMC board is also positioned flat (e.g., horizontally) on top of the motherboard, and adjacent to the BMC board. This layout can take up a lot of space, depending on the dimensions of the BMC board and the memory card.

Further, the system sled is often not uniformly sized. A typical system sled has a height of 1U or 2U, while a typical BMC board and a typical memory card are much thinner than 1U. As such, the conventional, horizontal layout of the BMC board and/or the memory card to the BMC board makes it difficult to access such boards for maintenance and/or replacement. Even if the BMC board is elevated (e.g., via a BMC carrier) to match a 1U system sled, the same configuration cannot readily be applied to a 2U system sled.

Thus, a need exists for a BMC board mounting system that (i) can accommodate various dimensions of memory cards, and (ii) is efficient in allocating space for the electronic components. The present disclosure is directed to addressing this need.

SUMMARY

According to some implementations of the present disclosure, a BMC carrier module includes a BMC carrier bracket and a thumb screw. The BMC carrier bracket has a back plate, a top plate, a side plate, and a corner plate. The corner plate of the BMC carrier bracket includes a first section and a second section. The second section of the corner plate extends perpendicularly from the first section of the corner plate. The BMC carrier bracket is configured to receive a BMC board between the first section of the corner plate and the side plate. The BMC board includes an aperture to receive a screw to secure the BMC board to the BMC carrier bracket. The screw secures the BMC board at a distance from the back plate of the BMC carrier bracket. The thumb screw is coupled to the second section of the corner plate of the BMC carrier bracket. The thumb screw is configured to bias a memory carrier module against the side plate, thereby securing the memory carrier module to the BMC carrier module.

In some examples, the BMC carrier module is couplable to a motherboard at a bottom side of the BMC carrier bracket. The bottom side of the BMC carrier bracket is opposite from the top plate of the BMC carrier bracket.

In some examples, the memory carrier module includes a front cover, a back cover, and one or more clips. The one or more clips are configured to couple the front cover and the back cover of the memory carrier module to opposite sides of a memory card. In some examples, the front cover of the memory carrier module includes openings for heat dissipation from the memory card. In some examples, the front cover of the memory carrier module includes one or more corresponding depressions for receiving the one or more clips. In some examples, the front cover of the memory carrier module includes one or more apertures. The one or more apertures are configured to receive corresponding one or more protrusions extending from the back cover of the memory carrier module. The corresponding one or more protrusions of the back cover are configured to interference-fit with the one or more apertures of the front cover.

In some examples, the side plate of the BMC carrier bracket includes a proximal portion and a distal portion. The proximal portion is coupled to the back plate of the BMC carrier bracket. The distal portion includes an elongated slot. The side plate extends farther from the back plate than the corner plate, such that the thumb screw is configured to (i) bias the memory carrier module at a first end of the memory carrier module, and (ii) urge a reciprocal finger at an opposite end of the memory carrier module to fit through the elongated slot of the side plate.

In some examples, the BMC carrier bracket is configured to receive the BMC board substantially in parallel to a plane defined by the back plate of the BMC carrier bracket. In some examples, the BMC carrier bracket is further configured to receive the BMC board and the memory carrier module substantially in parallel.

In some examples, the BMC carrier bracket is dimensioned to receive the memory carrier module having varying lengths of between 141 to 146 mm. In some examples, the memory carrier module substantially mimics a length and a width of a memory card to be received by the memory carrier module. In some examples, the memory card is a M.2 card or a M.3 card.

According to some implementations of the present disclosure, a server includes a motherboard, a BMC carrier bracket, a memory carrier module, and a thumb screw. The BMC carrier bracket is coupled to the motherboard at a bottom side of the BMC carrier bracket. The BMC carrier bracket includes a back plate, a top plate, a side plate, and a corner plate. The top plate is opposite from the bottom side of the BMC carrier bracket. The corner plate includes a first section and a second section. The second section of the corner plate extends perpendicularly from the first section of the corner plate. The BMC carrier bracket is configured to receive a BMC board between the first section of the corner plate and the side plate. The BMC board includes an aperture to receive a screw to secure the BMC board to the BMC carrier bracket. The screw secures the BMC board at a distance from the back plate of the BMC carrier bracket. The memory carrier module is configured to receive a memory card. The thumb screw is coupled to the second section of the corner plate of the BMC carrier bracket. The thumb screw is configured to bias the memory carrier module against the side plate of the BMC carrier bracket, thereby securing the memory carrier module to the BMC carrier bracket.

In some examples, the memory carrier module includes a front cover, a back cover, and one or more clips. The one or more clips are configured to couple the front cover and the back cover to opposite sides of the memory card.

In some examples, the side plate of the BMC carrier bracket includes a proximal portion and a distal portion. The proximal portion is coupled to the back plate of the BMC carrier bracket. The distal portion includes an elongated slot. The side plate extends farther from the back plate than the corner plate, such that the thumb screw is configured to (i) bias the memory carrier module at a first end of the memory carrier module, and (ii) urge a reciprocal finger at an opposite end of the memory carrier module to fit through the elongated slot of the side plate.

In some examples, the BMC carrier bracket is configured to receive the BMC board substantially perpendicular to the motherboard. In some examples, the thumb screw is configured to bias the memory carrier module against the side plate of the BMC carrier bracket such that the memory card is substantially perpendicular to the motherboard.

In some examples, the server further includes a system sled. The system sled has a sled height that is no less than a bracket height of the BMC carrier bracket. In some examples, a ratio of the sled height to the bracket height is about 2:1. In some examples, a memory carrier height of the memory carrier module is about the same as the bracket height of the BMC carrier bracket.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims.

DETAILED DESCRIPTION

Figure 1:
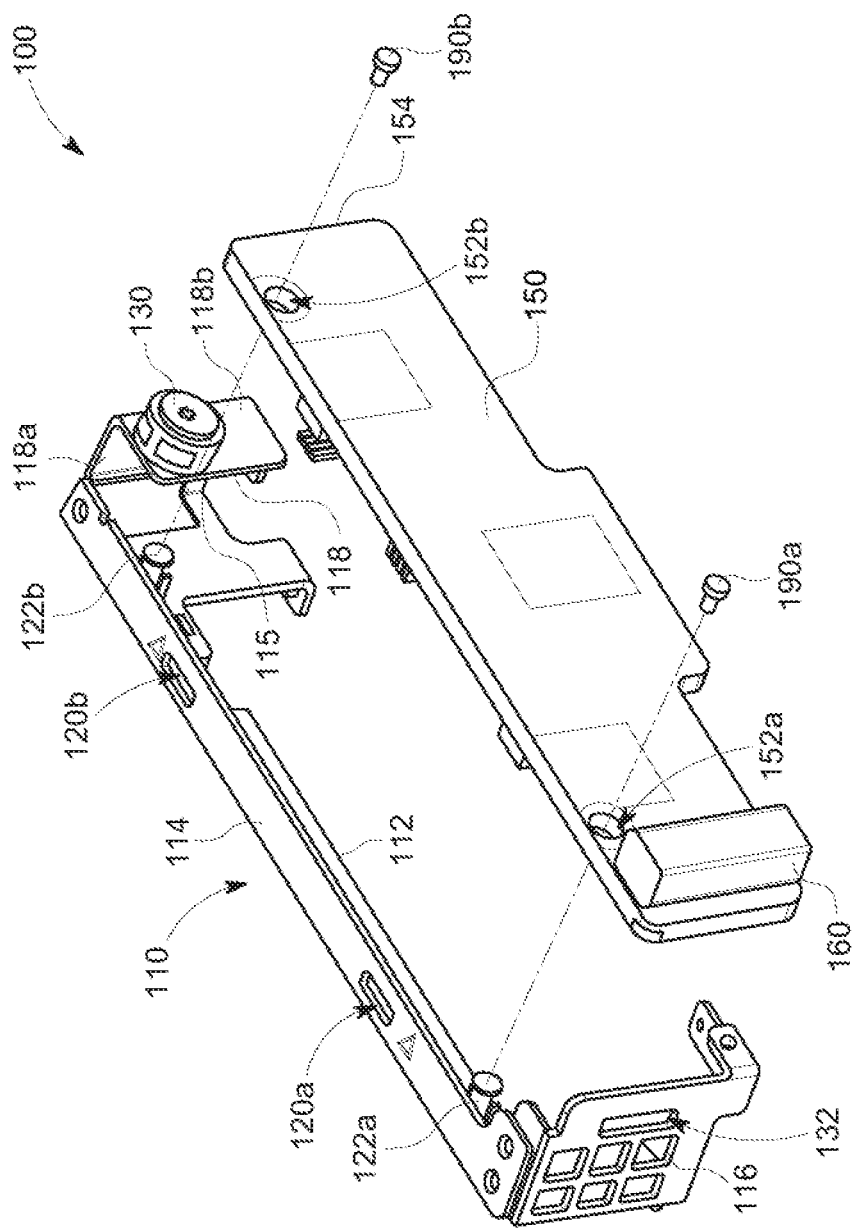
FIG. 1 depicts a front axonometric view of an example BMC carrier module, according to some implementations of the present disclosure.

The present inventions can be embodied in many different forms. Representative embodiments are shown in the drawings, and will herein be described in detail. These embodiments are examples or illustrations of the principles of the disclosure but are not intended to limit its broad aspects. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Currently, M.2 Solid State Drives (SSDs) are primarily used for consumer devices. For example, the 2280 M.2 form factor (22×80 mm) was largely driven by the portable computing market. Thus, capacities were targeted at that PCB size. However, SSDs for computing devices in data centers require additional PCB space for capacitors providing drives with power loss protection (PLP). This challenge can sometimes be solved with 22110 (110 mm long) M.2 SSDs, and/or M.3 SSDs.

Generally, M.2 memory cards are rectangular, with an edge connector on one side (75 positions with up to 67 pins, 0.5 mm pitch, pins on opposing sides of the PCB are offset from each other), and a semicircular mounting hole at the center of the opposite edge. Each pin on the connector is rated for up to 50 V and 0.5 A, while the connector itself is specified to endure up to 60 mating cycles (i.e., withstand repeated connection and disconnection for up to 60 times). The M.2 standard allows card widths of 12, 16, 22 and 30 mm, and lengths of 16, 26, 30, 38, 42, 60, 80 and 110 mm.

Currently, M.2 memory cards are commonly 22 mm wide, but come in a variety of lengths. M.2 codes contain both the width and the length of a particular card; for example, a card code of 2242 means that the card is 22 mm wide and 42 mm long, while a code of 2280 denotes a card 22 mm wide and 80 mm long. Thus, common lengths for M.2 drives and mounting are 30 mm (2230), 42 mm (2242), 60 mm (2260), 80 mm (2280), and 110 mm (22110).

The M.3 form factor for PCIe SSDs includes a wider surface (30.5 mm versus the 22 mm width of M.2). The M.3 memory cards can come in a variety of lengths as well. Manufacturers can integrate, on M.3 memory cards, additional NAND memory packages, failure capacitors, or even larger controllers. The capacity for a M.3 memory card can range between 240 GB and 16 TB, and sometimes higher.

As disclosed herein, a conventional server layout includes a BMC board positioned flat on top of the motherboard, and a memory card positioned flat on top of the motherboard adjacent to the BMC board. This horizontal layout can take up a lot of space, depending on the dimensions of the BMC board and the memory card. Moreover, with next-generation platforms sporting more RAM capacities (e.g. 16 DIMMs per CPU or 32 DIMMs per system), motherboard PCBs are growing in size, and space is at a premium. That makes 110 mm length M.2 drives too large to fit in many current 80 mm designs.

Thus. according to some implementations, the present disclosure is directed to a BMC carrier module configured to receive a BMC board substantially perpendicular (e.g., upright) to the motherboard. In some implementations, the BMC carrier module further receives a memory card for the BMC board, such that the memory card is also substantially perpendicular (e.g., upright) to the motherboard. Thus, the disclosed BMC carrier module allows for a space-saving configuration for the BMC board and the memory card. Further, in some implementations, the BMC carrier module can accommodate a variety of dimensions of memory cards, such as any of the M.2 SSDs and M.3 SSDs described above.

Referring to FIG. 1, a front axonometric view of a BMC carrier module 100 is depicted, according to some implementations of the present disclosure. The BMC carrier module 100 includes a BMC carrier bracket 110 and a thumb screw 130. The BMC carrier bracket 110 includes a back plate 112, a top plate 114, a side plate 116, and a corner plate 118. The top plate 114 is integral to the back plate 112, and extends perpendicularly from the back plate 112. In some implementations, the top plate 114 includes two openings 120a and 120b to allow ventilation. The side plate 116 is removably coupled to a first end of the back plate 112. The side plate 116 is also removably coupled to a first end of the top plate 114, via, for example, screws or other attachment mechanisms.

The corner plate 118 of the BMC carrier bracket 110 includes a first section 118a and a second section 118b. The second section 118b of the corner plate 118 extends perpendicularly from the first section 118a of the corner plate 118. The first section 118a of the corner plate 118 is removably coupled to a second end of the top plate 114, which is opposite from the first end of the top plate 114. The second section 118b of the corner plate 118 is integrally coupled to a second end of the back plate 112, via an L-shaped connector 115, which is opposite from the first end of the back plate 112.

The BMC carrier bracket 110 is configured to receive a BMC board 150 between the first section 118a of the corner plate 118 and the side plate 116. In some implementations, the BMC board 150 is received by the BMC carrier bracket 110, such that an edge 154 of the BMC board 150 rests against the L-shaped connector 115. Therefore, the edge 154 of the BMC board 150 is not in direct contact with the first section 118a of the corner plate 118. Instead, the edge 154 of the BMC board 150 is at a distance from the first section 118a, which is defined by a gap between the L-shaped connector 115 and the first section 118a.

In some implementations, the BMC board 150 includes two apertures 152a and 152b, to receive two respective screws 190a and 190b. The screws 190a and 190b secure the BMC board 150 to the BMC carrier bracket 110. In turn, the BMC carrier bracket 110 can accept the two respective screws 190a and 190b at two corresponding receivers 122a and 122b. The two corresponding receivers 122a and 122b protrude from the back plate 112 of the BMC carrier bracket 110. A first side of the BMC board 150 rests against the two corresponding receivers 122a and 122b. The first side of the BMC board 150 is located at a distance from the back plate 112 of the BMC carrier bracket 110.

In some implementations, the BMC board 150 is modified to include a block 160 on a second side of the BMC board 150, which is opposite from the first side of the BMC board 150. The block 160 prevents accidental contact between the first side of the BMC board 150 and a memory carrier module 300, when the memory carrier module 300 is received by the BMC carrier module 100 (shown in FIG. 4).

Figure 7:
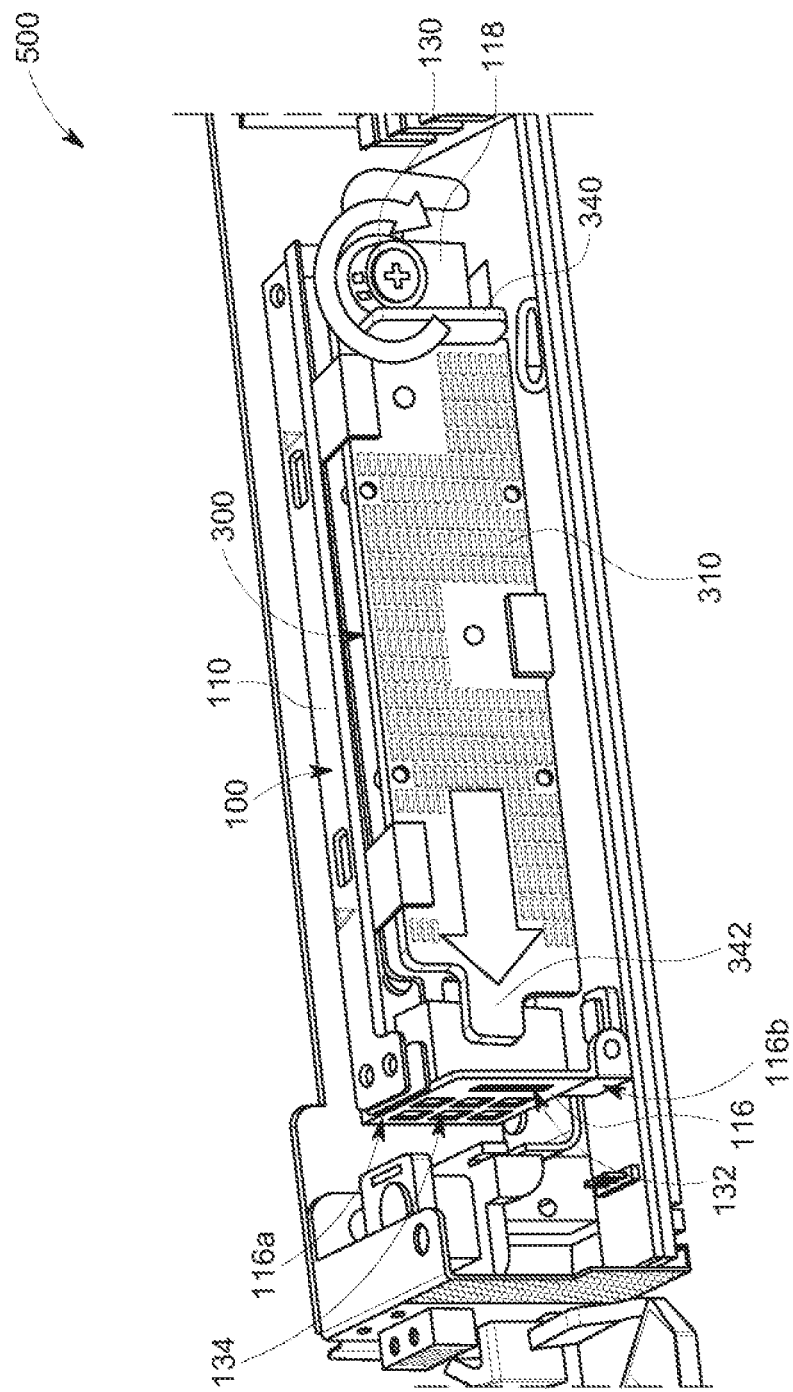
FIG. 7 depicts a front axonometric view of the BMC carrier module of FIG. 1 securing the memory carrier module of FIG. 4, according to some implementations of the present disclosure.

Still referring to FIG. 1, the thumb screw 130 is coupled to the second section 118b of the corner plate of the BMC carrier bracket, on an opposite side from the L-shaped connector 115. The thumb screw 130 is configured to bias the memory carrier module 300 against the side plate 116, thereby securing the memory carrier module 300 to the BMC carrier module 100 (FIG. 7).

Figure 2:
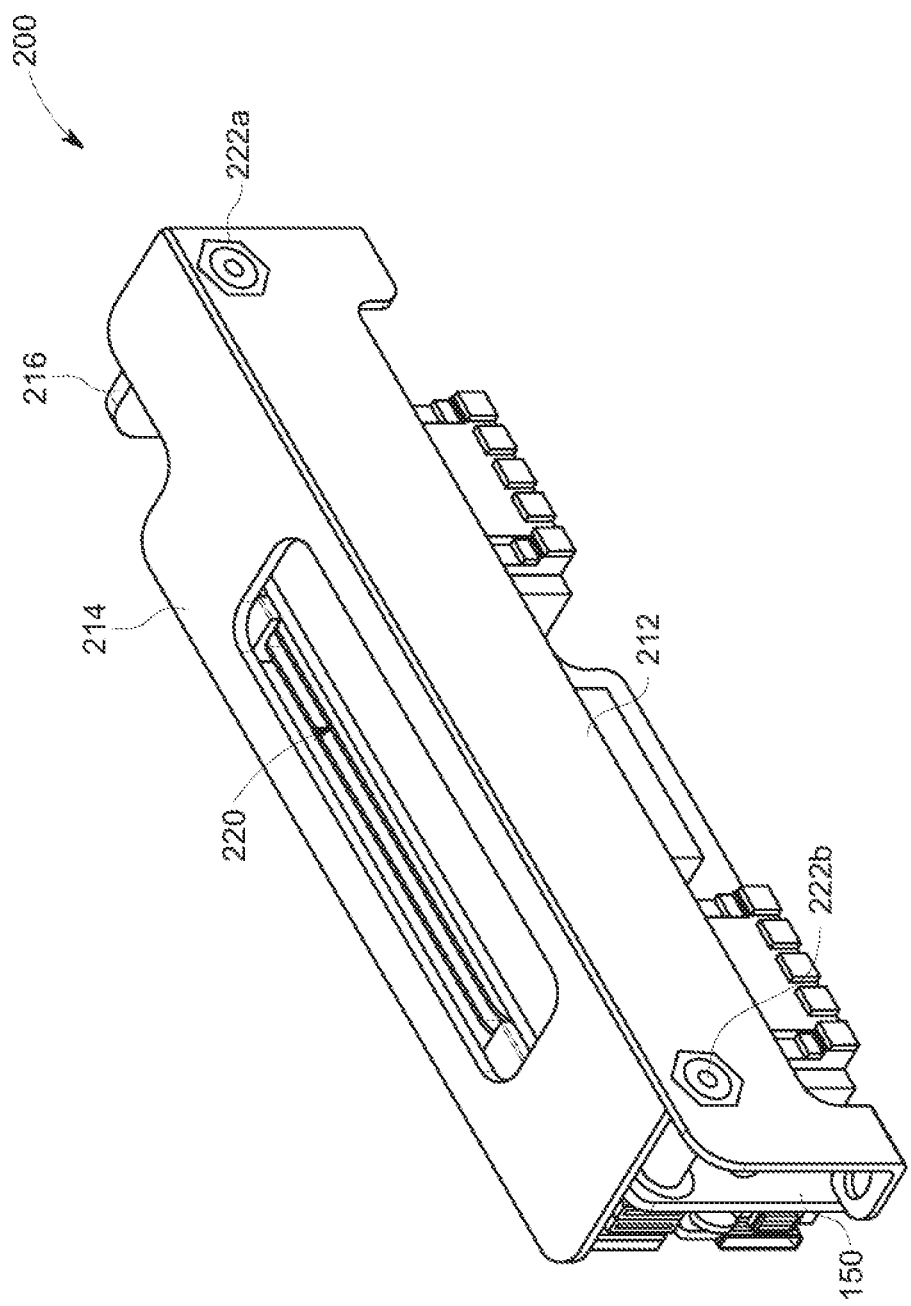
FIG. 2 depicts a rear axonometric view of another example BMC carrier module, according to some implementations of the present disclosure.

In some implementations, the BMC carrier module is shaped and dimensioned to accommodate specific IC chips of the BMC. For example, the IC chips may be located at different sides of the BMC. Referring now to FIG. 2, a rear axonometric view of an alternative BMC carrier module 200 is depicted, according to some implementations of the present disclosure. The BMC carrier module 200 is the same as, or similar to, the BMC carrier module 100, where like reference numbers refer to like elements. In FIG. 2, the corner plate, the L-shaped connector, and the thumb screw of the BMC carrier module 200 are optional or not needed, which ensures that the bracket does not interfere with components of the BMC board.

The BMC carrier module 200 includes a back plate 212, a top plate 214, and a side plate 216. The top plate 214 is integral to the back plate 212, and extends perpendicularly from the back plate 212. In this example, the dimensions of the top plate 214 differ from those of the top plate 114 of the BMC carrier module 100 in FIG. 1. The top plate 214 of the BMC carrier module 200 extends farther from the back plate 212, than does the top plate 114 of the BMC carrier module 200 from the back plate 112 (in FIG. 1). In other words, the top plate 214 is larger than the top plate 114. The top plate 214 includes a single opening 220 to allow for ventilation. The side plate 216 is integrally coupled to a first end of the back plate 212. The side plate 216 is also integrally coupled to a first end of the top plate 214. Further, in some implementations, the BMC carrier module 200 includes the receivers 222a and 222b, which are the same as, or similar to, the receivers 122a and 122b of the BMC carrier module 100.

Figure 3:
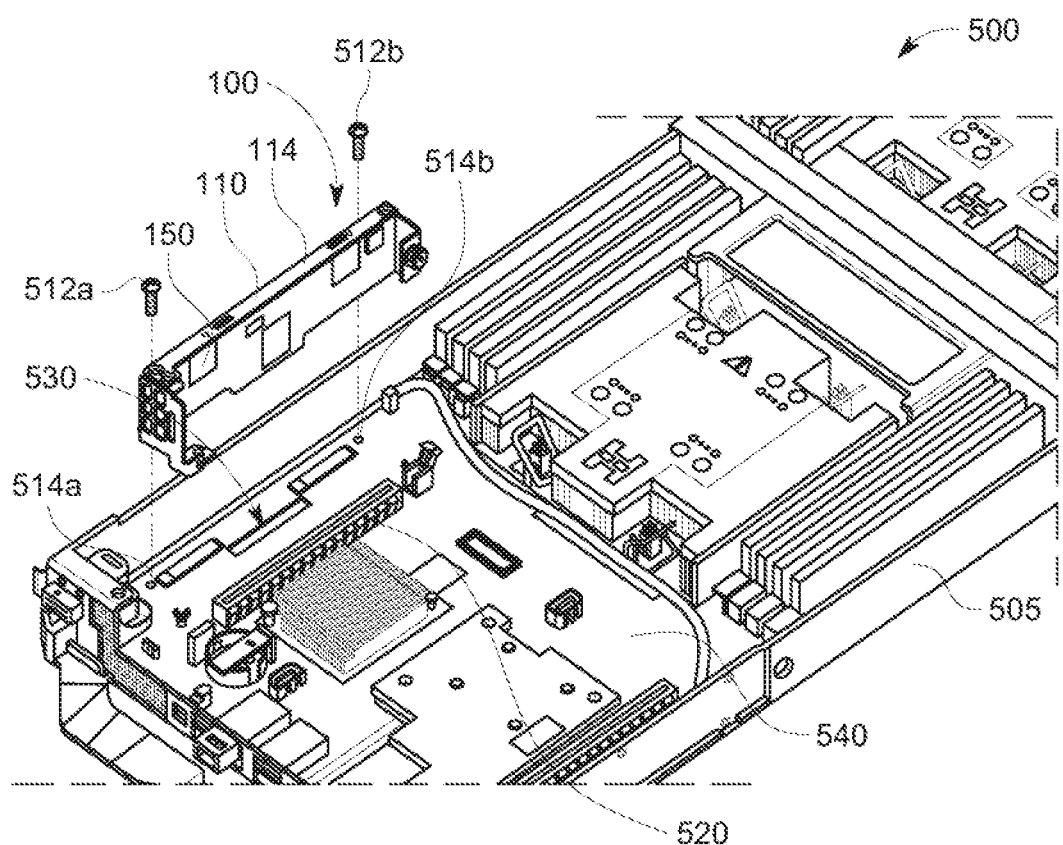
FIG. 3 depicts a top axonometric view of the BMC carrier module of FIG. 1 being installed in a server, according to some implementations of the present disclosure.

FIG. 3 shows a top axonometric view of the BMC carrier module 100 of FIG. 1 being installed in a server 500, according to some implementations of the present disclosure. The server 500 includes a motherboard 540, and the BMC carrier module 100. The motherboard 540 lays flat at the bottom of the system sled 505. The BMC carrier bracket 110 of the BMC carrier module 100 is coupled to the motherboard 540 at a bottom side of the BMC carrier bracket 110, which is opposite from the top plate 114 of the BMC carrier bracket 110.

As shown, in some implementations, the BMC board 150 is installed substantially in parallel to a plane defined by the back plate 112 (best shown in FIG. 1) of the BMC carrier bracket 110. Thus, when connected to a receiving slot 530 of the motherboard 540, the BMC board 150 stands upright, and substantially perpendicular to the motherboard 540. In some implementations, the BMC carrier bracket 110 can be secured to the motherboard 540 by two tamper screws 512a and 512b. In turn, the motherboard 540 includes two corresponding anchors 514a and 514b to receive the two tamper screws 512a and 512b.

Figure 4:
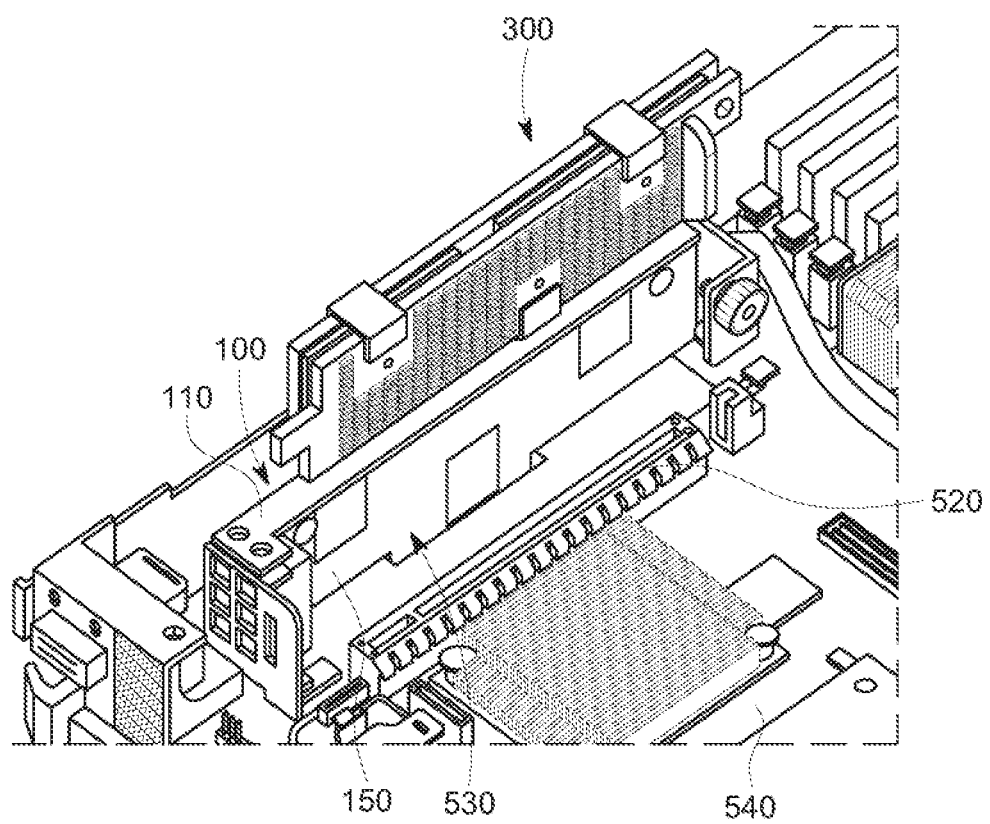
FIG. 4 depicts a top axonometric view of the BMC carrier module of FIG. 1 receiving a memory carrier module, according to some implementations of the present disclosure.

According to some implementations of the present disclosure, once the BMC carrier module 100 and the BMC board 150 are installed and secured to the motherboard 540, the memory carrier module 300 can be inserted into the BMC carrier module 100, as shown in FIG. 4. FIG. 4 shows a top axonometric view of the BMC carrier module 100 receiving the memory carrier module 300. Like reference numbers in FIG. 4 refer to like elements in FIG. 1. As shown, the BMC carrier bracket 110 is configured to receive the memory carrier module 300 substantially in parallel to the BMC board 150. Thus, when connected to a corresponding DIMM slot 520 of the motherboard 540, the memory card inside the memory carrier module 300 stands upright, which is substantially perpendicular to the motherboard 540.

The BMC carrier module 100 is configured to accommodate memory carrier modules of various dimensions, such as the memory carrier module 300 of FIGS. 5A-5D, and the memory carrier module 400 of FIGS. 6A-6D. For example, FIGS. 5A-5D depict a process of assembling a partial example of the memory carrier module 300, according to some implementations of the present disclosure. The memory carrier module 300 includes a front cover 310 and a back cover 320.

Figure 5A:
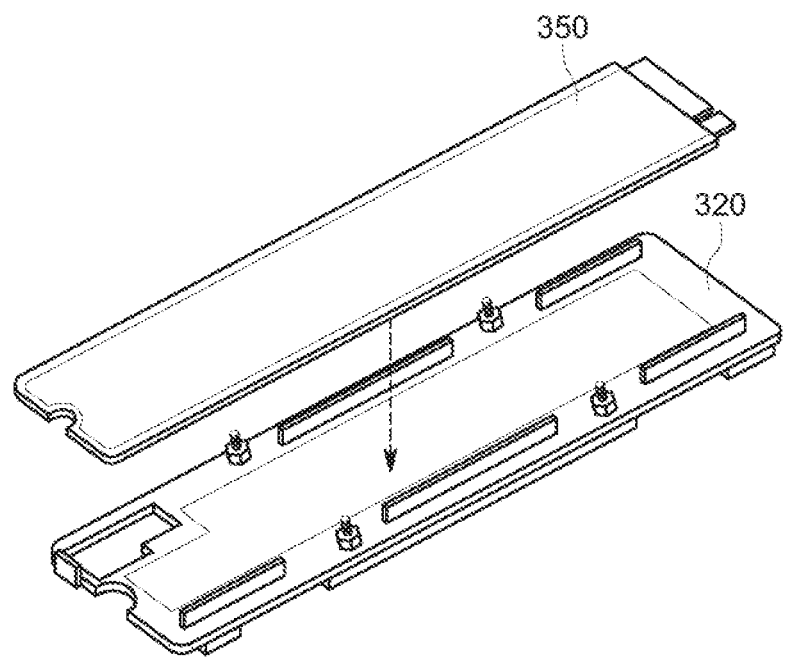
FIGS. 5A-5D depict a process of assembling a first example of a memory carrier module, according to some implementations of the present disclosure.
Figure 5B:
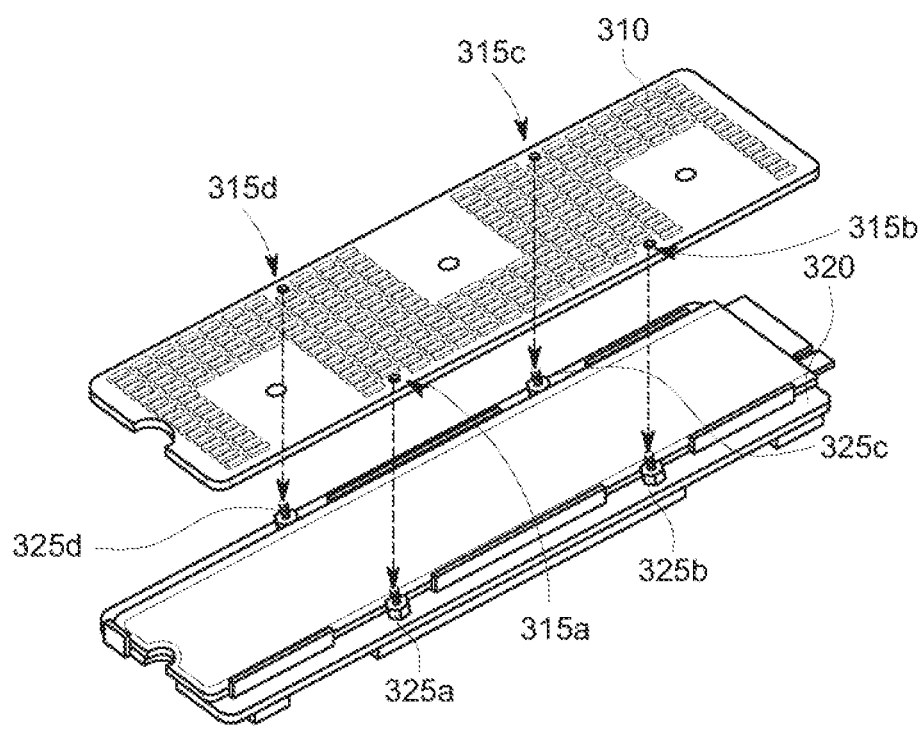

As shown in FIG. 5A, a memory card 350 (e.g., a M.2 card) is placed on top of the back cover 320. Then, as shown in FIG. 5B, the front cover 310 is placed on top of the memory card 350. The back cover 320 includes four protrusions 325a, 325b, 325c, and 325d, extending from the body of the back cover 320. The front cover 310 includes four corresponding apertures 315a, 315b, 315c, and 315d. The apertures (315a, 315b, 315c, and 315d) of the front cover 310 can receive the corresponding protrusions (325a, 325b, 325c, and 325d) of the back cover 320. In some implementations, the memory card 350 is secured between the front cover 310 and the back cover 320, via an interference-fit between the apertures 315a, 315b, 315c, and 315d, and the protrusions 325a, 325b, 325c, and 325d.

Figure 5C:
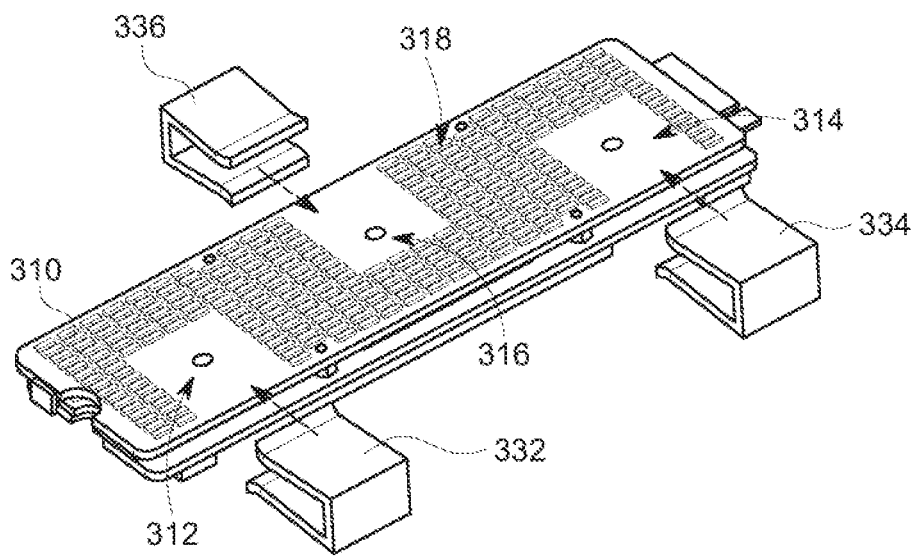
Figure 5D:
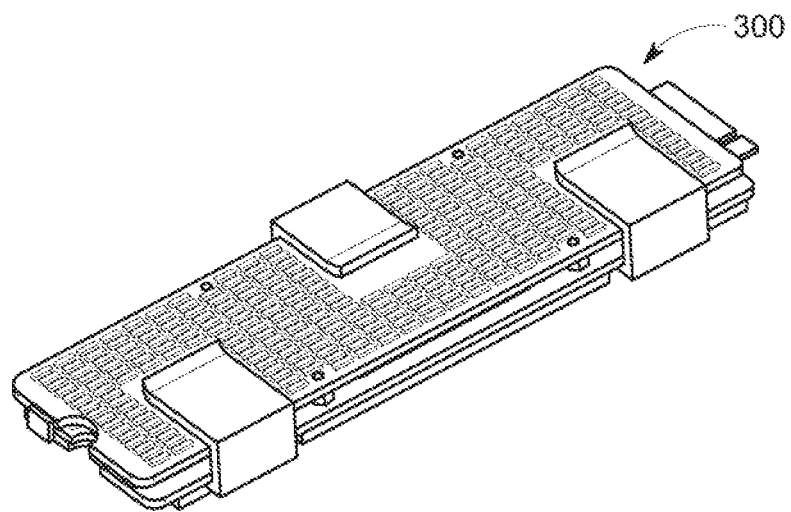
Figure 6A:
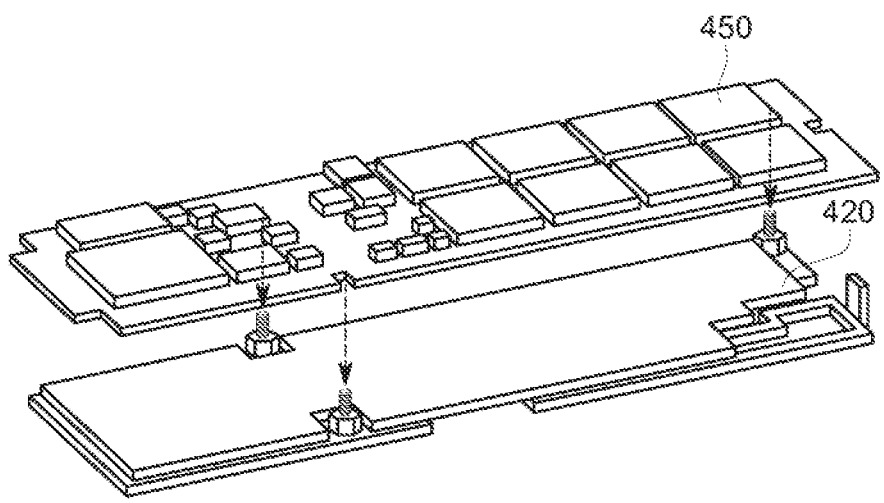
FIGS. 6A-6D depict a process of assembling a second example of a memory carrier module, according to some implementations of the present disclosure.
Figure 6B:
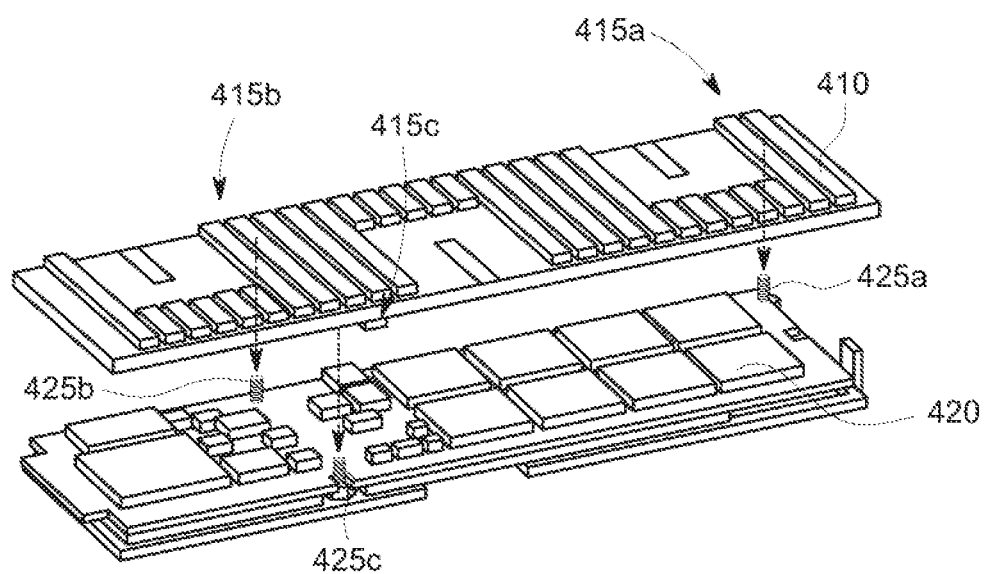
Figure 6C:
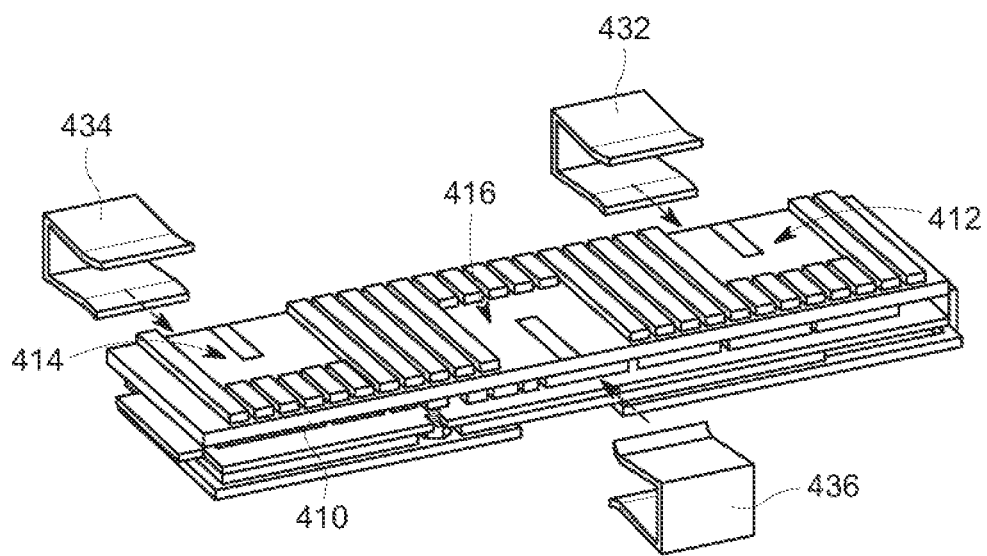
Figure 6D:
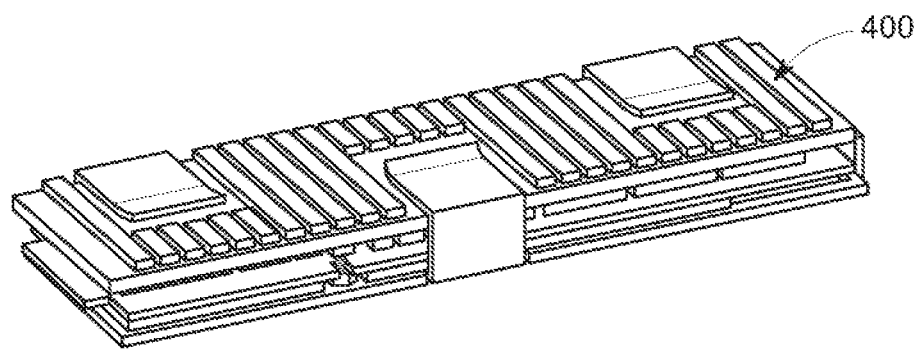

Referring to FIG. 5C, the memory card 350 can be further secured between the front cover 310 and the back cover 320, via three clips 332, 334, and 336. In some implementations, the three clips 332, 334, and 336 are spring clips. As shown, the front cover 310 includes three corresponding depressions 312, 314, and 316, for receiving the three clips 332, 334, and 336. In some implementations, the front cover 310 further includes a plurality of openings 318 (e.g. ventilations holes) to allow better dissipation of the heat generated by the memory card 350. In some implementations, the front cover 310 and/or the back cover 320 substantially mimics the length and the width of the memory card 350. Lastly, as shown in FIG. 5D, the memory carrier module 300 is fully assembled, where the memory card 350 is secured between the front cover 310 and the back cover 320.

Turning now to FIGS. 6A-6D, a process of assembling an alternative memory carrier module 400 is depicted, according to some implementations of the present disclosure. The process of assembling the memory carrier module 400 is the same as, or similar to, the process of assembling the memory carrier module 300, where like reference numbers refer to like elements. As shown, the back cover 420 includes three protrusions 425a, 425b, and 425c; and the front cover 410 includes three apertures 415a, 415b, and 415c, respectively. Further, in some implementations, the front cover 410 includes three corresponding depressions 412, 414, and 416, for receiving the three clips 432, 434, and 436. The memory carrier module 400 is dimensioned to accommodate a memory card 450 (e.g., a M.3 card) that has dimensions different from the example M.2 memory card 350 of FIGS. 5A-5D.

Therefore, while FIG. 4 depicts the BMC carrier module 100 receiving the memory carrier module 300 (thus the memory card 350), the BMC carrier module 100 is also configured to receive memory cards of other dimensions, such as the memory card 450 of FIGS. 6A-6D.

Referring to FIG. 7, once the memory carrier module 300 is inserted into the BMC carrier module 100, the memory carrier module 300 is biased against the side plate 116 of the BMC carrier bracket 110. The side plate 116 of the BMC carrier bracket 110 includes a proximal portion 116a and a distal portion 116b. The proximal portion 116a is coupled to the back plate 112 (best shown in FIG. 1) of the BMC carrier bracket 110. The proximal portion 116a can also include openings 134 (e.g., ventilation holes) for dissipation of heat generated by the BMC board (e.g., the BMC board 150 in FIG. 1) and/or the memory card (e.g., the memory card 350 in FIGS. 5A-5D).

In some implementations, the front cover 310 of the memory carrier module 300 further includes a tab 340 near a first end and a finger 342 at the opposite end. The tab 340 extends perpendicularly from the main body of the front cover 310, while the finger 342 extends along the length of the front cover 310. In some such implementations, the distal portion includes an elongated slot 132, the shape of which matches a cross-section of the finger 342 of the memory carrier module 300. As shown, the side plate 116 extends farther from the back plate 112 than the corner plate 118 does. As such, the thumb screw 130 can (i) bias the tab 340 of the memory carrier module 300 towards the side plate 116, and (ii) urge the finger 342 of the memory carrier module 300 to fit through the elongated slot 132 of the side plate 116, until the memory carrier module 300 is stopped and secure.

Figure 8:
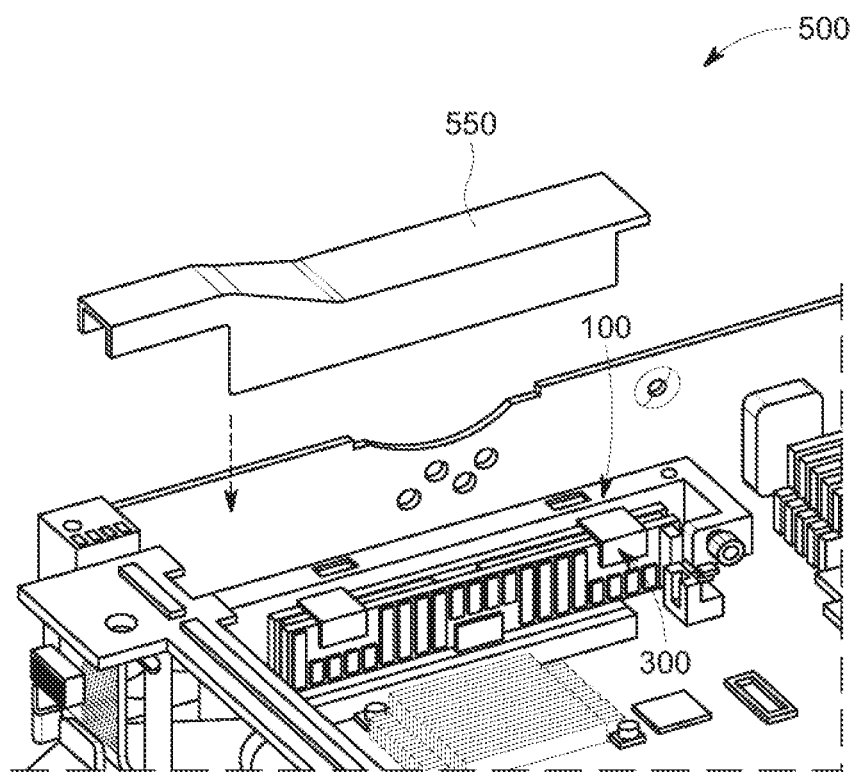
FIG. 8 depicts a front axonometric view of the BMC carrier module of FIG. 7 receiving an air duct, according to some implementations of the present disclosure.
Figure 9:
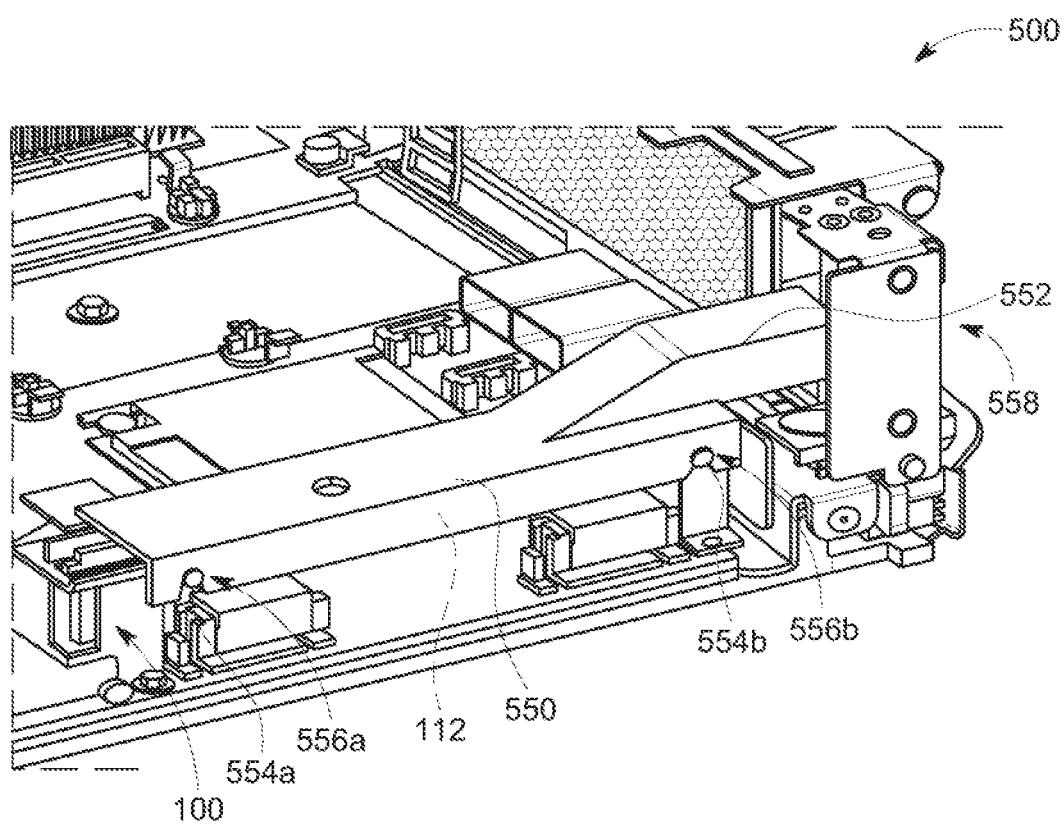
FIG. 9 depicts a rear axonometric view of the BMC carrier module of FIG. 8 with the air duct installed, according to some implementations of the present disclosure.

FIG. 8 is a front axonometric view, and FIG. 9 is a rear axonometric view, of the server 500 and an air duct 550. As shown in FIG. 8, in some implementations, the server 500 further includes the air duct 550, which is placed above the BMC carrier module 100 and the memory carrier module 300. The air duct 550 is installed in the server 500, over the carrier module 100 and the memory carrier module 300, according to some implementations of the present disclosure. The air duct 550 includes a main body that is dimensioned to cover the top portion of both the BMC carrier module 100 and the memory carrier module 300.

Referring to FIG. 9, placement of the air duct 550 can be guided by two protrusions 554a and 554b of the server 500. In some implementations, the two protrusions 554a and 554b are formed on the back plate 112 of the BMC carrier module 100. The two protrusions 554a and 554b fit in corresponding slots 556a and 556b in the air duct 550. The air duct 550 includes a narrower, raised channel 552, which redirects heated air generated by the electronic components (e.g., the BMC board and/or the memory card) towards a dedicated outlet 558 of the server 500.

Figure 10:
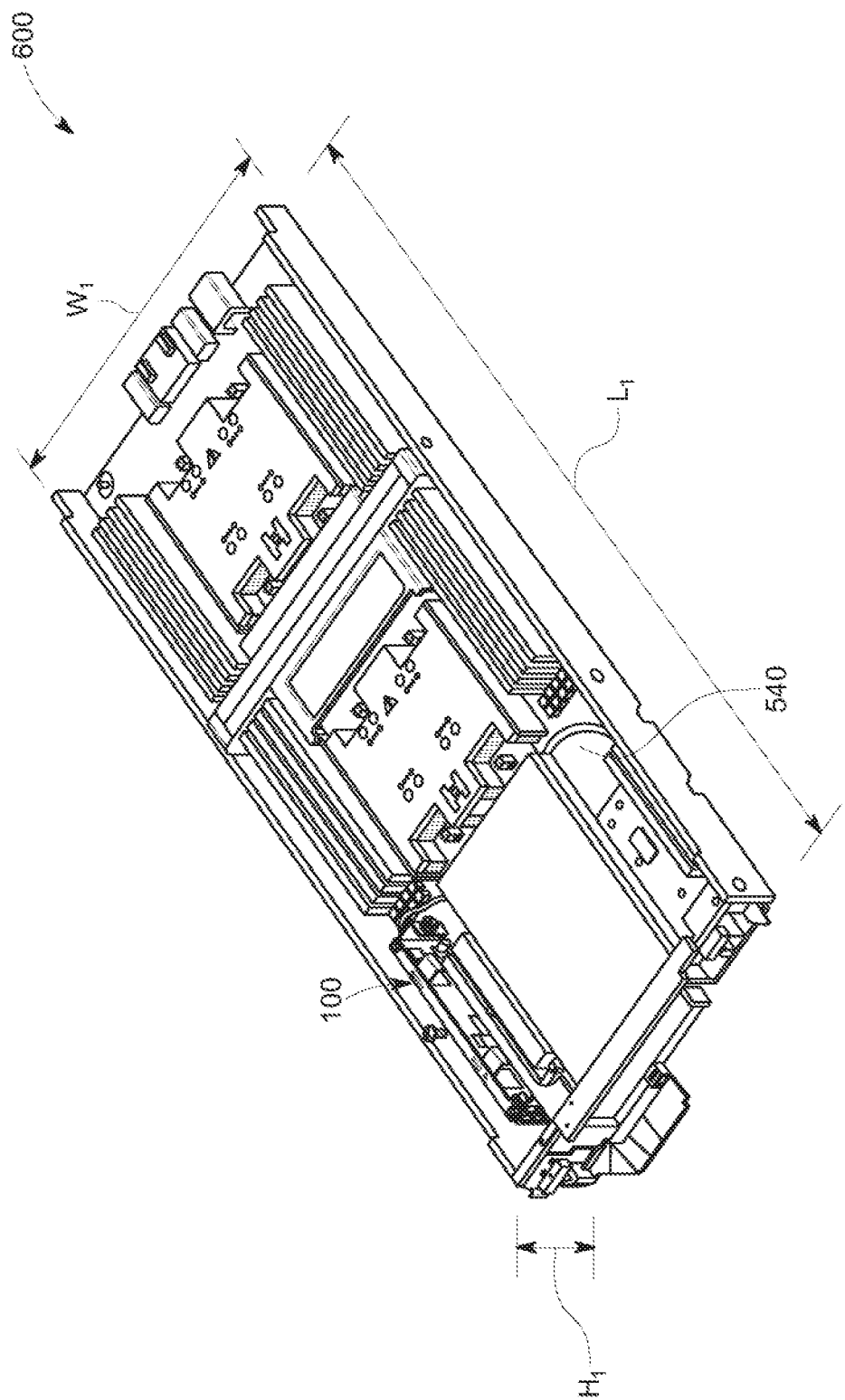
FIG. 10 depicts a top axonometric view of a 1U server chassis having the BMC carrier module of FIG. 1, according to some implementations of the present disclosure.

Referring to FIG. 10, a top axonometric view of a 1U server chassis 600 is shown, according to some implementations of the present disclosure. The server chassis 600 is a single node standard storage server chassis. The height $H_1$ of the server chassis 600 is about 1U, which is about 40 mm. The width $W_1$ of the server chassis 600 is about 218.5 mm. The length (e.g., depth) $L_1$ of the server chassis 600 is about 523 mm. A BMC carrier module, such as the BMC carrier module 100 disclosed herein, is installed in a front corner of the server chassis 600. The BMC carrier module 100 can receive a BMC board and a memory card, both of which are installed in an upright position, relative to the motherboard 540. As such, the BMC carrier module 100 only occupies a relatively small amount of space across the width $W_1$ of the server chassis 600. Height-wise, the BMC carrier module 100 is about the same height as the $H_1$ of the server chassis 600, which is about 1U. Thus, additional space on the motherboard 540 is freed-up for installation of additional components.

Figure 11:
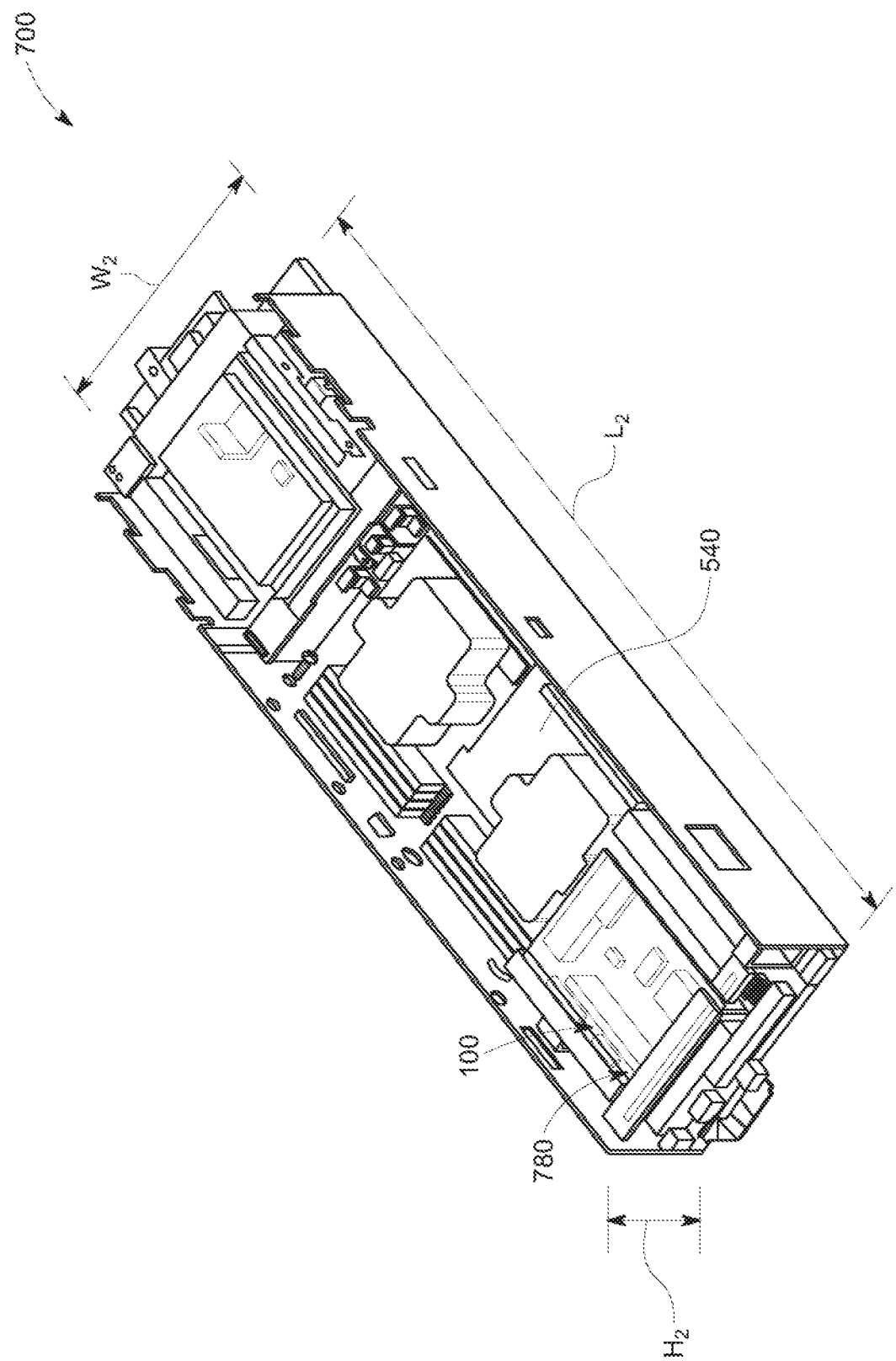
FIG. 11 depicts a top axonometric view of a 2U server chassis having the BMC carrier module of FIG. 1, according to some implementations of the present disclosure.

Referring to FIG. 11, a top axonometric view of a 2U server chassis 700 is depicted, according to some implementations of the present disclosure. The server chassis 700, as shown, is a dual node interference server chassis with a riser board of PCIe card. The height $H_2$ of the server chassis 700 is about 2U, which is about 81.8 mm. The width $W_2$ of the server chassis 700 is about 218.5 mm. The length (e.g., depth) $L_2$ of the server chassis 600 is about 762.9 mm. A BMC carrier module, such as the BMC carrier module 100 disclosed herein, is installed in a front corner of the server chassis 700. The BMC carrier module 100 can receive a BMC board and a memory card, both of which installed in an upright position, relative to the motherboard 540. As such, the BMC carrier module 100 only occupies a relatively small amount of space across the width $W_1$ of the server chassis 700. In addition, the riser board 780 elevates the BMC carrier module 100, which brings the height of the BMC carrier module 100 from about 1U to about 2U, so that the height of the BMC carrier module 100 matches the height $H_2$ of the server chassis 700.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A baseboard management controller (BMC) carrier module, comprising:
    a BMC carrier bracket having a back plate, a top plate, a side plate, and a corner plate, the corner plate including a first section and a second section, the second section of the corner plate extending perpendicularly from the first section of the corner plate, the BMC carrier bracket being configured to receive a BMC board between the first section of the corner plate and the side plate, wherein the BMC board includes an aperture to receive a screw to secure the BMC board to the BMC carrier bracket at a distance from the back plate of the BMC carrier bracket; and
    a thumb screw coupled to the second section of the corner plate of the BMC carrier bracket, the thumb screw being configured to bias a memory carrier module against the side plate, thereby securing the memory carrier module to the BMC carrier module.

2. The BMC carrier module of claim 1, wherein the BMC carrier module is couplable to a motherboard at a bottom side of the BMC carrier bracket opposite to the top plate of the BMC carrier bracket.

3. The BMC carrier module of claim 1, wherein the memory carrier module includes a front cover, a back cover, and one or more clips for coupling the front cover and the back cover to opposite sides of a memory card.

4. The BMC carrier module of claim 3, wherein the front cover of the memory carrier module includes a plurality of openings for heat dissipation from the memory card.

5. The BMC carrier module of claim 3, wherein the front cover of the memory carrier module includes one or more corresponding depressions for receiving the one or more clips.

6. The BMC carrier module of claim 3, wherein the front cover of the memory carrier module includes one or more apertures for receiving corresponding one or more protrusions extending from the back cover of the memory carrier module, the corresponding one or more protrusions of the back cover being configured to interference-fit the one or more apertures of the front cover.

7. The BMC carrier module of claim 1, wherein the side plate of the BMC carrier bracket includes a proximal portion and a distal portion, wherein the proximal portion is coupled to the back plate of the BMC carrier bracket, and the distal portion includes an elongated slot; and wherein the side plate extends farther from the back plate than the corner plate, such that the thumb screw is configured to (i) bias the memory carrier module at a first end of the memory carrier module, and (ii) urge a reciprocal finger at an opposite end of the memory carrier module to fit through the elongated slot of the side plate.

8. The BMC carrier module of claim 1, wherein the BMC carrier bracket is configured to receive the BMC board substantially in parallel to a plane defined by the back plate of the BMC carrier bracket.

9. The BMC carrier module of claim 8, wherein the BMC carrier bracket is configured to receive the BMC board and the memory carrier module substantially in parallel.

10. The BMC carrier module of claim 1, wherein the BMC carrier bracket is dimensioned to receive the memory carrier module having varying lengths of between 141 to 146 mm.

11. The BMC carrier module of claim 10, wherein the memory carrier module substantially mimics a length and a width of a memory card to be received by the memory carrier module.

12. The BMC carrier module of claim 11, wherein the memory card is a M.2 card or a M.3 card.

13. A server comprising:
a motherboard;
a BMC carrier bracket coupled to the motherboard at a bottom side of the BMC carrier bracket, the BMC carrier bracket including a back plate, a top plate opposite the bottom side of the BMC carrier bracket, a side plate, and a corner plate, the corner plate including a first section and a second section, the second section of the corner plate extending perpendicularly from the first section of the corner plate, the BMC carrier bracket being configured to receive a BMC board between the first section of the corner plate and the side plate, wherein the BMC board includes an aperture to receive a screw to secure the BMC board to the BMC carrier bracket at a distance from the back plate of the BMC carrier bracket;
a memory carrier module for receiving a memory card; and
a thumb screw coupled to the second section of the corner plate of the BMC carrier bracket, the thumb screw being configured to bias the memory carrier module against the side plate of the BMC carrier bracket, thereby securing the memory carrier module to the BMC carrier bracket.

14. The server of claim 13, wherein the memory carrier module includes a front cover, a back cover, and one or more clips for coupling the front cover and the back cover to opposite sides of the memory card.

15. The server of claim 13, wherein the side plate of the BMC carrier bracket includes a proximal portion and a distal portion, wherein the proximal portion is coupled to the back plate of the BMC carrier bracket, and the distal portion includes an elongated slot; and wherein the side plate extends farther from the back plate than the corner plate, such that the thumb screw is configured to (i) bias the memory carrier module at a first end of the memory carrier module, and (ii) urge a reciprocal finger at an opposite end of the memory carrier module to fit through the elongated slot of the side plate.

16. The server of claim 13, wherein the BMC carrier bracket is configured to receive the BMC board substantially perpendicular to the motherboard.

17. The server of claim 13, wherein the thumb screw is configured to bias the memory carrier module against the side plate of the BMC carrier bracket such that the memory card is substantially perpendicular to the motherboard.

18. The server of claim 13, further comprising a system sled having a sled height that is no less than a bracket height of the BMC carrier bracket.

19. The server of claim 18, wherein a ratio of the sled height to the bracket height is about 2:1.

20. The server of claim 19, wherein a memory carrier height of the memory carrier module is about the same as the bracket height of the BMC carrier bracket.

* * * * *